United States Patent Office 3,410,900
Patented Nov. 12, 1968

3,410,900
PRODUCTION OF PHENYLHYDRAZINE
Hubert Kindler, Ludwigshafen (Rhine), and Dominik Schuler, Mannheim, Germany, assignors to Badische Anilin- & Soda-Fabrik Aktiengesellschaft, Ludwigshafen (Rhine), Germany
No Drawing. Filed Mar. 17, 1966, Ser. No. 535,014
Claims priority, application Germany, Mar. 20, 1965, B 81,091
8 Claims. (Cl. 260—569)

ABSTRACT OF THE DISCLOSURE

A process for the production of phenylhydrazine or salts thereof in which phenyldiazonium salts are reacted with at least a 30% excess of a sodium hydrogen sulfite reducing agent. The process produces high yields as capable of high space/time yields. Additionally, the reaction product is of high purity.

---

This invention relates to a new and advantageous method of preparing phenylhydrazine and relates particularly to a method in which phenyl diazonium salts are reacted by means of alkali metal or alkaline earth metal hydrogen sulfites in excess.

According to a prior art method of E. Fischer, phenylhydrazine may be prepared by reduction of phenyl diazonium chloride by means of sodium sulfite which is used in a small stoichiometric excess. This method proceeds via diazobenzene sulfonic acid and phenylhydrazine sulfonic acid. Reduction to phenylhydrazine sulfonic acid has to be completed by adding zinc dust. After the solution has been filtered, the phenylhydrazine sulfonic acid is hydrolyzed to phenylhydrazine and sulfuric acid and the phenylhydrazine base is liberated by means of caustic soda solution and distilled. Yields of up to 70% of theoretical of phenylhydrazine can be obtained.

The reduction has been carried out on a commercial scale with a mixture of sodium sulfite and sodium hydrogen sulfite in a molar ratio of about 2:1, of which again only a small stoichiometric excess of about 5% is used. If further reduction be carried out with zinc dust, yields of distilled phenylhydrazine of up to about 85% of the theory may be achieved.

It has also become known from U.S. patent specification No. 3,203,989 that in the said process the use of zinc dust can be dispensed with if the reduction be carried out in a pH range of 5.5 to 5.8 and a temperature of 80° to 85° C. be maintained for sixty to ninety minutes.

According to another prior art method, phenyl diazonium chloride is reduced in hydrochloric acid solution with sulfurous acid. Phenylhydrazine hydrochloride may be isolated in a yield of 94% of the theory, but the concentration of the phenylhydrazine in the reduction mixture is only about 1% by weight and therefore to isolate the phenylhydrazine hydrochloride it is necessary to concentrate the solution to one quarter of its original volume. The method has therefore not been introduced into industry.

We have now found that phenylhydrazine or its salts are obtained in a high yield, concentration and purity by the reduction of phenyl diazonium salts by means of sulfurous acid or salts thereof in an aqueous reaction mixture first at low temperature and later at elevated temperature, by first using a temperature of from −5° to +50° C. and using as reducing agent substantially an alkali metal hydrogen sulfite or an alkaline earth metal hydrogen sulfite in an excess of at least 30 to 50% above the stoichiometric amount, then completing the reaction in a conventional way at a temperature of 10° to 150° C. and, if desired, recovering phenylhydrazine in the usual way from the phenyl hydrazinium salt solution thus obtained.

The new process has several important advantages over the prior art. First, the yields obtained by it (which are from about 92% to 94% of the theory) are not achieved by the conventional industrial methods. Moreover, particularly in its continuous embodiment, it gives space/time yields not hitherto achieved, which may amount to more than 5 kg. of phenylhydrazine per liter of reaction space per day. In accordance with the high yields, the amount of byproducts obtained is so small that the phenyl hydrazinium salt solution formed may as a rule be further processed without being worked up or purified. The yields are so high that the usual further reduction with zinc, to achieve a further increase in yield, is generally unnecessary. Supervision and control is also simple in the new process, for example the desired pH value may be automatically set up. Finally considerable costs may be saved because the phenylhydrazine is obtained in the form of relatively concentrated solutions so that there is no need to evaporate large amounts of water.

The phenyl diazonium salt solutions used for the new process may be prepared in a conventional way from aqueous solutions of aniline salts, usually of 10 to 25 wt. % strength, with diazotizing agents, such as nitrous acid, esters of nitrous acid or nitrosyl compounds. The anions of the phenyl diazonium salts are mainly those of the mineral acids, especially hydrochloric acid, sulfuric acid or nitric acid.

It is a particular feature of the process of the invention that this starting material is substantially reduced with an alkali metal hydrogen sulfite or an alkaline earth metal hydrogen sulfite. By "substantially" we mean that minor amounts of free sulfurous acid or sulfite may be present and act as reducing agents in addition to the hydrogen sulfite. It is advantageous that a content of 25 mole % of free sulfurous acid and 60, particularly 30, mole % of sulfite (in each case with reference to hydrogen sulfite) should not be exceeded. The requirement that substantially a hydrogen sulfite is used as reducing agent may be met in various ways. For example a hydrogen sulfite solution, advantageously a sodium hydrogen sulfite solution, may be allowed to act on the phenyl diazonium salt. The sodium hydrogen sulfite solutions are as a rule of 40 to 50 wt. % strength. Of course, it is also possible to start from a sulfite solution and to add appropriate amounts of sulfurous acid or sulfur dioxide or other acids. The phenyl diazonium salt solution usually contains a certain amount of free mineral acid, for example up to 0.5 mole per mole of phenyl diazonium salt, from its production. This mineral acid causes a shift in the ratio of sulfurous acid, hydrogen sulfite and sulfite; it must be taken into consideration, if it is present, in order to ensure that the reducing agent is in fact substantially a hydrogen sulfite.

Another essential feature of the process of the invention is that the reducing agent is used in a considerable molar excess over the stoichiometric amount. According to stoichiometry, 2 moles of sulfite, hydrogen sulfite and/or sulfurous acid is required per mole of phenyl diazonium salt. In the process according to the present invention, however, an excess of at least 30 mole %, advantageously at least 50 mole %, over the amount of stoichiometrically required is used. There is no critical upper limit for the excess. From 3.2 to 5 moles of reducing agent is generally used per mole of phenyl diazonium salt.

The action of the reducing agent on the phenyl diazonium salt first takes place at a temperature of from −5° to +50° C., preferably from +15° to +30° C.

Pressure is not critical; it may vary for example from 0.2 to 5 atmospheres absolute, preferably from 0.9 to 1.1 atmospheres absolute. The time required for action at the said low temperature is in general from about 5 seconds to fifteen minutes, preferably from 2 to 5 minutes.

Reduction of the phenyl diazonium salt is then completed in the usual way, i.e. by maintaining the reaction mixture at 10° to 150° C., particularly 60° to 105° C., and this usually lasts for one to five minutes. Mineral acid which is required for hydrolysis of the intermediate compounds formed may be added in this stage or in a later stage. For example a strong mineral acid, such as sulfuric acid or particularly advantageously hydrochloric acid, is added in the usual way in such an amount, for example 1 to 5 equivalents per mole of phenylhydrazine, that the solution has a strongly acid reaction. Hydrolysis takes place to a considerable extent at the temperatures at which reduction is carried to completion. It is advantageous to additionally heat the mixture for some time, for example two to five minutes, at the boiling point in order to expel sulfurous acid and to complete the hydrolysis.

The process is carried out by first mixing the solutions of the reactants. In this and in the further reaction it is possible to work batchwise or, with special advantage, continuously and particularly in a cyclic process. The continuous process also has the advantage of relatively short throughput times of from ten to twenty-five minutes for the whole reaction, so that space-time yields can be achieved which have hitherto been unattainable.

During the reaction, sulfur dioxide is liberated in the reaction mixture and imparts thereto a pH value of from 0.3 to 4.5, preferably from 1.0 to 4.0, but also escapes in more or less large amounts. This escaping sulfur dioxide is advantageously combined by absorption, for example by means of caustic soda solution. The sulfite and hydrogen sulfite solution thus formed may be used for a fresh batch or, in a continuous process, returned to the process.

Phenylhydrazine salt solutions are obtained which usually contain from 4 to 6% by weight of reaction product. Recovery of the phenylhydrazine may be carried out by conventional methods, for example by precipitation as phenylhydrazine hydrochloride. Owing to the purity of the reaction product it is as a rule possible however to carry out further reaction immediately without any working up; separation of the acids present is also not usually necessary because free mineral acid is used as a rule as a catalyst for reaction of phenylhydrazine. In the direct reaction of the phenylhydrazine solution it can therefore hardly be dispensed with. If a particularly pure reaction product is required, it is possible to interpose without difficulty, advantageously prior to or during the second stage of the process, an extraction of the reaction mixture with organic solvents, such as hydrocarbons, halohydrocarbons, ethers, esters or high alcohols, particularly toluene, the xylenes or tetrachloroethylene. In this way any byproducts formed may be substantially removed from the reaction mixtures in a simple way.

It is surprising that the reduction of phenyl diazonium salts to phenyl hydrazine is so successful at pH values of about 2. In U.S. patent specification No. 3,203,989 it is stated that pH values of less than 5.0 should be avoided since otherwise the formation of byproducts is favoured. It is also surprising that such good results are achieved with a large excess of reducing agent because for example Gattermann-Wieland, "Die Praxis des Organischen Chemikers" (The practical work of the organic chemist), 3rd edition (1948), p. 268, lines 6 to 10, states that more than 2.5 moles of sulfite per mole of phenyl diazonium salt should not be used.

The invention is illustrated by the following examples in which parts are by weight unless otherwise stated; parts by weight bear the same relation to parts by volume as the gram to the liter.

EXAMPLE 1

100 parts of aniline is dissolved in 400 parts of 22.5% hydrochloric acid and diazotized in the presence of ice with 74 parts of sodium nitrite. The solution of phenyl diazonium chloride obtained is slowly introduced into 1115 parts of 40% sodium hydrogen sulfite solution having a temperature of 5° C. The reaction mixture is then heated within twenty minutes to 90° C. A pale yellow solution is formed, to which 320 parts of 36% hydrochloric acid is added; the whole is then heated to boiling point and kept boiling for five minutes. The solution formed, which contains 40 parts of phenyl hydrazine per part by volume (equivalent to a yield of 94.2% of the theory) may be processed immediately, for example reacted with aldehydes to form phenylhydrazones.

By following the above procedure but interposing a further reduction with 5 parts of zinc dust and filtration of the flocculent precipitate formed after twenty minutes before reaction with hydrochloric acid, phenylhydrazine in an equally highly concentrated solution is obtained in a yield of 97% of the theory after the said reaction with hydrochloric acid.

EXAMPLE 2

A phenyl diazonium chloride solution which contains about 100 parts of phenyl diazonium chloride per part by volume and has a temperature of 50° C. is prepared continuously by the method of French patent specification No. 1,419,092.

960 parts of this phenyl diazonium chloride solution and 1230 parts of 40% sodium hydrogen sulfite solution are mixed together per hour in a circulation reactor in which a temperature of 25° C. is maintained by means of a water-cooled heat exchanger. The mixture is heated to 80° C. in a subsequent reactor and kept at this temperature for five minutes. In a further reactor, 360 parts per hour of 36% hydrochloric acid is added per hour to the mixture and then the sulfurous acid is expelled in a column at atmospheric pressure. After a residence time of twenty-three minutes in the whole apparatus, a solution is thus obtained which contains about 45 parts of phenylhydrazine per part by volume of solution (equivalent to a yield of 93.3% of the theory) and which if desired may be used for further reactions immediatley.

Sulfur dioxide is disengaged in those parts of the apparatus through which the reaction solution flows and this is advantageously absorbed in caustic soda solution and returned to the apparatus as 40% sodium hydrogen sulfite solution.

EXAMPLE 3

If it is desired to prepare the phenyl hydrazonium salt as such, the procedure of Example 2 is followed but the reaction mixture is extracted with 200 parts per hour of tetrachlorethylene or toluene in the vessel in which the reaction mixture is obtained at 80° C. and which is constructed as an extraction vessel. The extraction may also be carried out simultaneously with the addition of the 36% hydrochloric acid, the mixing vessel being constructed as an extractor in this case as well. The solvent removes coloured products in a yield of about 1% by weight of the yield of phenylhydrazine from the reaction solution. Phenylhydrazine hydrochloride is allowed to separate from the solution in a crystallizing vessel while cooling and is recovered in a beautiful crystalline form and in high purity by means of a centrifuge while being washed with a little water to remove inorganic neutral salts. The salt is thus obtained in a yield of more than 95% of the theory with reference to the amount of phenylhydrazine first formed.

EXAMPLE 4

By following the procedure of Example 2 but adding the hydrogen chloride not as therein stated in dissolved form but as a gas by leading it into an absorption column at the rate of 135 parts per hour, the phenylhydrazine is obtained in the same yield and quality as in Example 2 but in a concentration of about 55 parts per part of reaction solution.

We claim:

1. A process for the production of phenylhydrazine or mineral acid salts thereof by reduction of phenyl diazonium mineral acid salts by means of sulfurous acid or salts thereof in aqueous medium wherein the reaction is commenced at from $-5°$ to $+50°$ C. and an alkali metal hydrogen sulfite or an alkaline earth metal hydrogen sulfite is used as reducing agent in at least a 30% excess over the stoichiometric amount and then the reaction is completed by maintaining the reaction mixture at a temperature of 10° to 150° C., the latter temperature being higher than the temperature in the first stage.

2. A process as claimed in claim 1 in which the phenylhydrazine is recovered from the phenyl hydrazinium salt solution thus formed.

3. A process as claimed in claim 1 wherein an alkali metal hydrogen sulfite is used in the form of a 40 to 50% aqueous solution of sodium hydrogen sulfite.

4. A process as claimed in claim 1 wherein the hydrogen sulfite is used in an excess of at least 50 mole percent.

5. A process as claimed in claim 1 wherein the reducing agent is used at the rate of 3.2 to 5 moles per mole of phenyl diazonium salt.

6. A process as claimed in claim 1 wherein the first stage of the reaction is carried out at 15° to 30° C.

7. A process as claimed in claim 1 wherein the second stage is carried out at 60° to 105° C.

8. A process for the production of phenylhydrazine or its hydrochloride by reduction of phenyl diazonium chloride by means of sulfurous acid or sodium hydrogen sulfite in aqueous medium wherein the reaction is started at a temperature of from $-5°$ to $+50°$ C. and sodium hydrogen sulfite is used in at least a 30% excess over the stoichiometric amount and then the reaction is completed by maintaining the reaction mixture at a temperature higher than in the first stage and ranging from 10° to 150° C.

References Cited

UNITED STATES PATENTS 3,203,989  8/1965  Hupfer _____ 260—569

FOREIGN PATENTS 758,395  10/1956  Great Britain.

CHARLES B. PARKER, *Primary Examiner.*

ROBERT V. HINES, *Assistant Examiner.*